United States Patent
Greenwood

(10) Patent No.: US 8,292,772 B2
(45) Date of Patent: Oct. 23, 2012

(54) CONTINUOUSLY VARIABLE TOROIDAL TRANSMISSION

(75) Inventor: Christopher John Greenwood, Preston (GB)

(73) Assignee: Torotrak (Development) Limited, Lancashire (GB)

( * ) Notice: Subject to any disclaimer, the term of this patent is extended or adjusted under 35 U.S.C. 154(b) by 968 days.

(21) Appl. No.: 11/816,025

(22) PCT Filed: Feb. 10, 2006

(86) PCT No.: PCT/EP2006/050861
§ 371 (c)(1),
(2), (4) Date: Jan. 22, 2008

(87) PCT Pub. No.: WO2006/084906
PCT Pub. Date: Aug. 17, 2006

(65) Prior Publication Data
US 2008/0153659 A1   Jun. 26, 2008

(30) Foreign Application Priority Data
Feb. 11, 2005  (GB) .................................... 0502926

(51) Int. Cl.
*F16H 15/48* (2006.01)
*F16H 15/38* (2006.01)

(52) U.S. Cl. ......................................... 475/192; 476/40
(58) Field of Classification Search .................. 475/185, 475/191, 190, 192, 197, 214; 476/39, 40
See application file for complete search history.

(56) References Cited

U.S. PATENT DOCUMENTS

| | | | | |
|---|---|---|---|---|
| 2,182,458 A | * | 12/1939 | Vickers | 74/388 R |
| 3,203,267 A | * | 8/1965 | De Brie Perry | 476/42 |
| RE26,917 E | * | 6/1970 | Dickenbrock | 74/732.1 |
| 3,822,610 A | | 7/1974 | Erban | |
| 4,382,188 A | * | 5/1983 | Cronin | 290/1 C |
| 4,524,642 A | | 6/1985 | Fritsch et al. | |
| 7,048,667 B2 | * | 5/2006 | DeVincent et al. | 475/214 |
| 8,096,918 B2 | * | 1/2012 | Dutson | 476/40 |
| 2002/0025876 A1 | | 2/2002 | Ooyama et al. | |
| 2005/0009664 A1 | | 1/2005 | Greenwood et al. | |
| 2005/0037887 A1 | * | 2/2005 | Shinojima et al. | 475/214 |

FOREIGN PATENT DOCUMENTS

| | | |
|---|---|---|
| EP | 1293707 A | 3/2003 |
| GB | 896203 A | 5/1962 |
| GB | 2379250 A | 3/2003 |
| WO | 9836191 A1 | 8/1998 |

OTHER PUBLICATIONS

International Search Report; International Application No. PCT/EP2006/050861; filed Oct. 2, 2006.
Written Opinion of the International Searching Authority; International Application No. PCT/EP2006/050861; filed Oct. 2, 2006.

* cited by examiner

*Primary Examiner* — Roger Pang
(74) *Attorney, Agent, or Firm* — Brooks Kushman P.C.

(57) ABSTRACT

A transmission comprises a toroidal variator having first and second spaced-apart drive discs (12, 14) defining a toroidal cavity about a rotational axis (x-x), a transmission input (22) arranged to drive the first and second drive discs (12, 14) in opposite directions and supported on pivotal mountings between the drive discs (12, 14), one or more rollers (18, 20) arranged to contact the said drive discs (12, 14) and be driven thereby, wherein the transmission output (44) is driven by orbiting of the pivotal mountings around the rotational axis of the variator.

20 Claims, 10 Drawing Sheets

CONTINUOUSLY VARIABLE TOROIDAL TRANSMISSION

BACKGROUND OF THE INVENTION

1. Field of the Invention

The present invention relates to infinitely variable ratio transmission apparatus of the toroidal race rolling traction type, hereinafter referred to as a variator.

2. Background Art

The basic form of variator comprises a toroidally-recessed input disc connected to an input drive shaft and a toroidally-recessed output disc arranged coaxially with respect to the input disc. A plurality of rollers (usually three rollers) is provided in the toroidal cavity defined between the input and output discs and power is transmitted from the input disc to the output disc by means of the rollers. The rollers are mounted in roller carriages which are subjected to transverse forces (usually by means of double-acting hydraulic pistons). The same hydraulic pressure is normally applied to a so-called end load chamber to apply an axial force to one of the discs in order to ensure that the rollers are frictionally engaged with the input and output discs.

Such transmissions are mainly designed for use in relatively high power, high torque applications such as in motor vehicle transmissions. Indeed, in order to be able to handle the levels of power and torque and to provide a more balanced transmission, it is normally necessary to utilise a pair of input discs and a pair of coaxially mounted output discs, defining two toroidal cavities, each of which encloses three rollers. One advantage of using three rollers in each toroidal cavity is that the arrangement is inherently stable in that roller contact at three equally-spaced locations around the discs minimises bending of the variator components and therefore minimises wear. However, it is also normally necessary for each roller to be provided with its own double-acting control piston and for the hydraulic pressures to be controlled by computer.

Whilst the cost of such sophistication is acceptable in motor vehicle transmissions, it discourages the use of variators in less demanding environments.

SUMMARY OF THE INVENTION

In accordance with a first aspect of the present invention, there is provided a transmission comprising a toroidal variator having first and second spaced-apart drive surfaces defining a toroidal cavity about a rotational axis, a transmission input arranged to drive the first and second drive surfaces in opposite directions and supported on pivotal mountings between the drive surfaces, one or more rollers arranged to contact the said drive surfaces and be driven thereby, wherein the transmission output is driven by orbiting of the pivotal mountings around the rotational axis of the variator.

In accordance with a second aspect of the present invention, there is provided a transmission comprising a toroidal variator having first and second spaced-apart drive surfaces defining a toroidal cavity about a rotational axis, and supported on pivotal mountings between the drive surfaces, one or more rollers arranged to contact the said drive surfaces, wherein the transmission has an input arranged to cause the pivotal mountings to orbit around the rotational axis of the variator such that the one or more rollers drive the spaced apart drive surfaces which are geared to rotate in opposite directions, the said spaced apart drive surfaces being connected to a common transmission output.

Preferably, the transmission ratio is variable by way of varying the relative diameters of contact loci between each roller and each of the first and second drive surfaces.

Preferably, the transmission ratio is variable by way of varying the angle subtended between an axis of each roller and the axis of the first or second drive surfaces.

Preferably, the first and second drive surfaces rotate in opposite directions but are connected to a common shaft by way of gearing.

The first and second drive surfaces are preferably arranged to rotate in opposite directions. Preferably, the first and second drive surfaces also rotate at the same speed.

The pivotal mountings are preferably connected to an output annulus, which is preferably connected to an output shaft.

An infinite range of positive and negative transmission ratios is preferably obtainable with the transmission of the invention. Where an infinite range of positive and negative transmission ratios are obtainable, the transmission may by used to provide forward and reverse gearing. A "geared neutral" is also preferably available, whereby a finite input speed is converted into a zero output speed without disconnecting the input from the output. Geared neutral preferably occurs where the rollers rotate about their axes, but do not precess.

The range of positive and negative transmission ratios available can be biased, i.e. the available range of ratios may be skewed to one side of geared neutral.

The gearing (or other suitable mechanism) for connecting a shaft (input or output) to the drive surfaces may be fixed-ratio gearing.

The transmission could be configured such that that geared neutral occurs at a limit of available ratio (determined in part by the size of the drive surface discontinuity, where provided) such that either positive or negative transmission ratios are obtainable. Where only a single direction is provided, a separate "reverse gear" may be provided in the transmission output.

Any number of rollers may be provided, although it is envisaged that two rollers provides a good compromise between weight, manufacturing costs, durability and complexity. Three or four rollers may be preferred in applications where greater durability is required or where high torques are to be transmitted.

The pivotal mountings of the rollers are preferably each mounted on a planet gear which engages with a sun gear and an output annulus which is connected to the transmission output.

The transmission preferably further comprises displacement means for rotating the sun gear with respect to the output annulus, whereby to adjust the inclination of the rollers.

In one embodiment, the displacement means comprise a control ring to which the sun gear is connected, means for rotating the control ring at the same speed as the output annulus and means for varying the angular displacement of the control ring with respect to the output annulus.

The means for rotating the control ring at the same speed as the output annulus preferably comprises a plurality of first rotary members in rolling contact with the output annulus and with a fixed surface radially outward of the output annulus and a plurality of second rotary members, each rotatably mounted on the same axle as a respective one of the first rotary members, in rolling contact with the control ring and with a further annular surface located radially outwardly of the control ring.

The rotary members preferably comprise rollers in frictional rolling contact, but may instead comprise gears.

Preferably, the further annular surface located radially outwardly of the control ring is angularly displaceable, thereby controlling the angular position of the control ring relative to the output annulus.

BRIEF DESCRIPTION OF THE DRAWINGS

Specific embodiments of the invention shall now be described, by way of example only, with reference to the accompanying drawings in which.

DETAILED DESCRIPTION OF THE PREFERRED EMBODIMENTS

Figure 1:
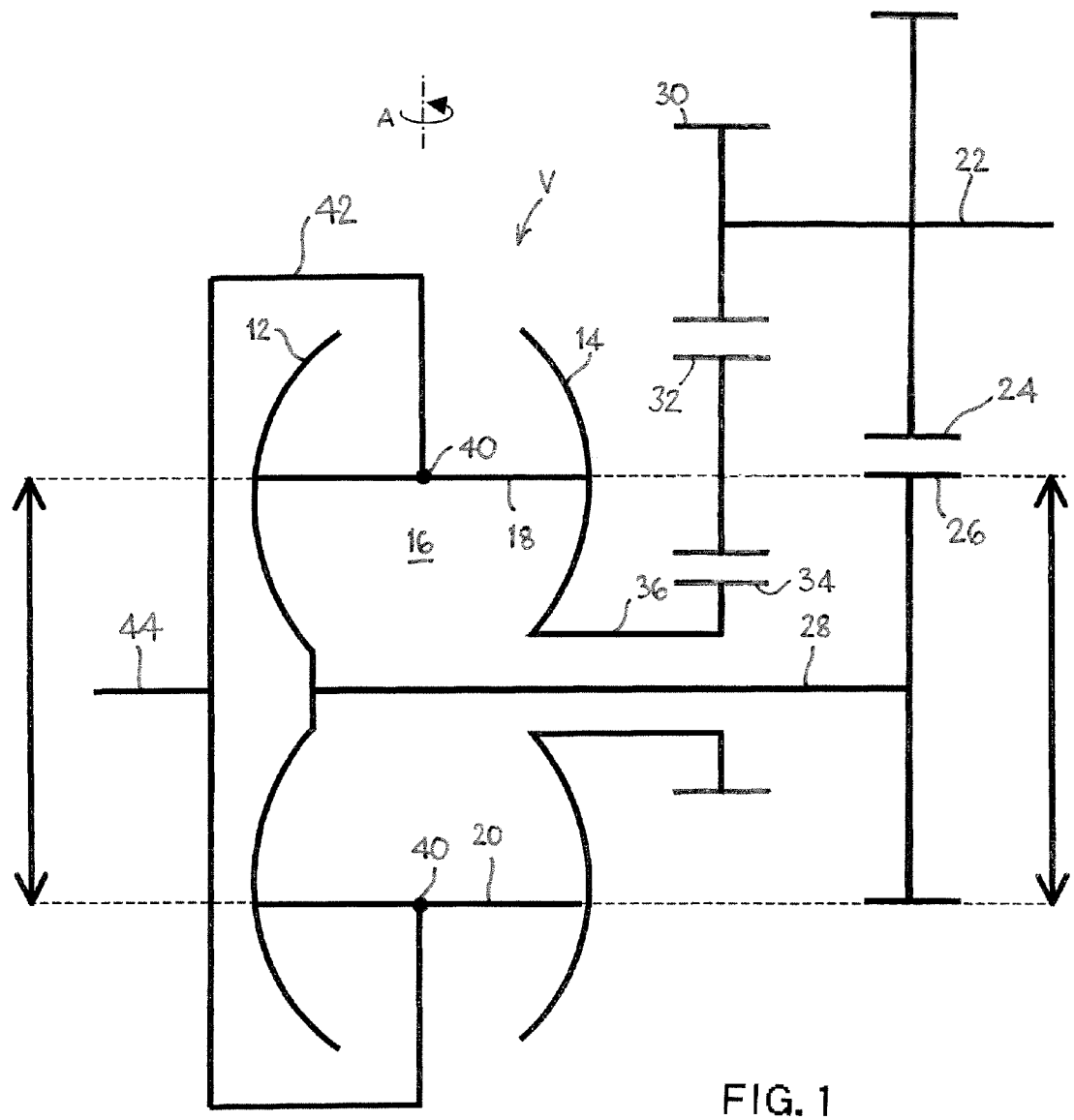
FIGS. 1 and 2 show schematic diagrams of a first embodiment of the invention.

Referring firstly to FIGS. 1 to 5b, a continuously variable ratio transmission system comprises a variator V having toroidally-recessed first and second discs 12, 14 defining a toroidal cavity 16 which receives two rollers 18, 20 in rolling contact with the toroidally-recessed face of each of the discs 12, 14. The first and second discs 12, 14 are driven in opposite directions from a common input shaft 22 which is connected to an engine. The rotation of the input shaft 22 is transferred from the first disc 12 by means of a first spur gear 24 mounted on the input shaft 22 which engages with an identically sized second spur gear 26 mounted on a first intermediate drive shaft 28 which is connected to the first disc 12. The rotation of the input shaft is transferred from the input shaft 22 to the second disc 14 by means of a third spur gear 30, attached to the input shaft 22. The spur gear 30 engages with a reversing idler gear 32 which in turn engages with a further spur gear 34 (of identical size to spur gear 30) which is mounted on a second tubular, intermediate drive shaft 36, arranged coaxially with the first intermediate drive shaft 28, which is connected to the second disc 14. In this way the two discs rotate in opposite directions to one another at the same speed as the input shaft 22.

The rollers 18, 20 are pivotally supported on mountings 40 which in turn are mounted on an annulus 42 connected to a transmission output shaft 44 arranged coaxially with the intermediate drive shafts 28, 36. As shown in FIGS. 3 to 5b, and as will be described in more detail shortly, the variator is provided with a mechanism for inclining the rotational axis of the rollers 18, 20.

Figure 2:
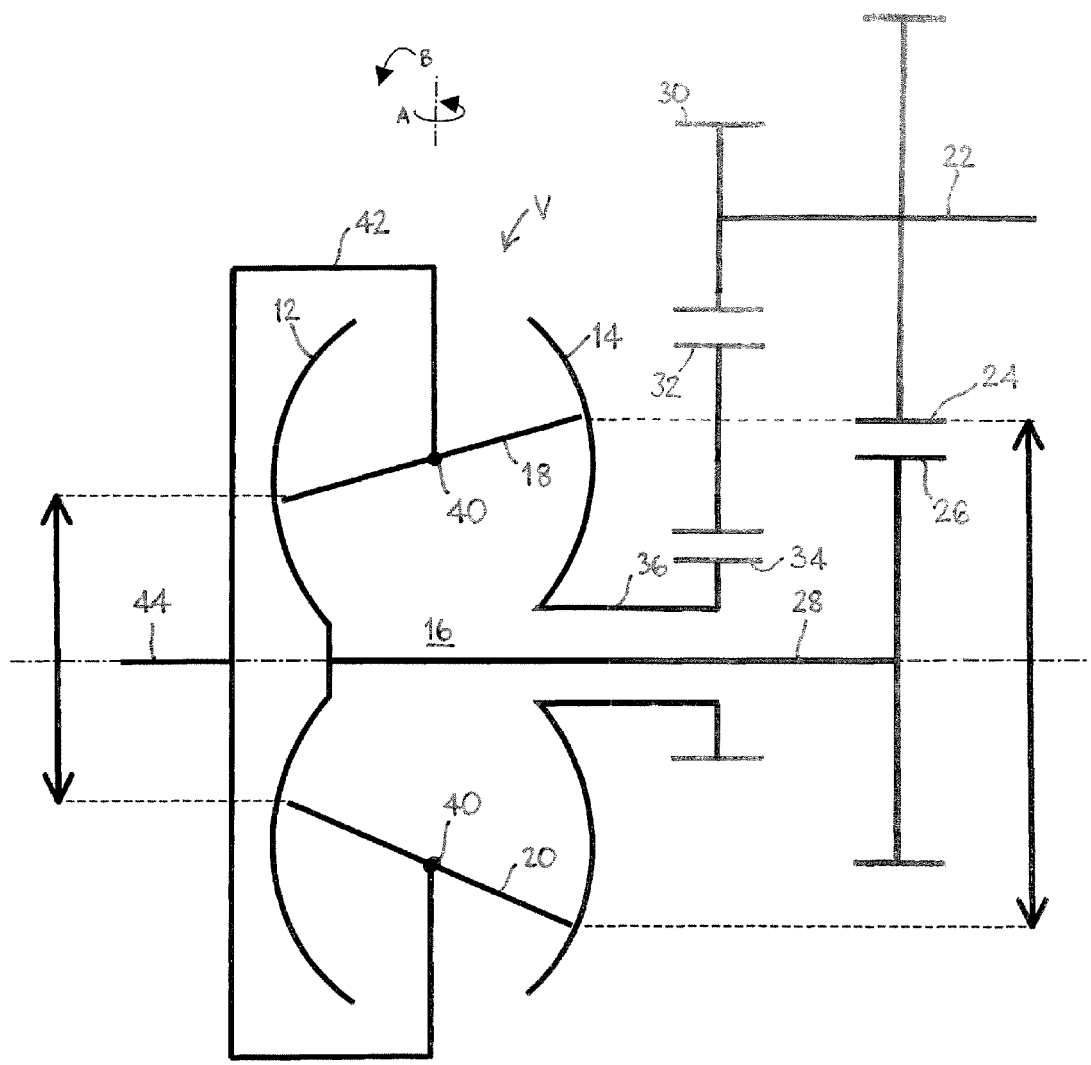

In the steady state, shown in FIG. 1, in which the rotational axes of the two rollers are perpendicular to the rotational axis of the variator, the planes of the rollers lie parallel to the rotational axis of the variator and the annulus 42 on which the rollers 18, 20 are mounted remains stationary with respect to the rotational axis of the variator. However, as the inclination of the rollers is varied, in response to driver demand (as shown in FIG. 2) the diametrically opposed portions of the rollers are in contact with portions of the discs 10, 12 located at different radial positions. Therefore, since the discs 10, 12 are constrained to move at the same speed, the annulus 42 on which the rollers 18, 20 are mounted is forced to orbit or precess about the rotational axis of the variator, thereby rotating the output shaft 44 to which it is connected.

Thus, by varying the inclination of the rollers (as will be explained), the speed of the output shaft 44 can be controlled.

An infinite range of positive and negative transmission ratios can be obtained (providing, e.g. "forward" and "reverse" gears in infinitesimal steps) in addition to a "geared neutral", whereby a finite input speed is converted into a zero output speed without disconnecting the input from the output. Geared neutral occurs where the rollers rotate about their axes, but do not precess as shown in FIG. 1.

Furthermore, the range of positive and negative transmission ratios available can be biased depending on the ratio of the velocities of the first and second discs 12, 14, which can be defined by appropriate selection of gearing transferring drive from the input 22 to the two discs 18, 20. In the illustrated example, the two discs 18, 20 are arranged to rotate at the same speed but they may be arranged to rotate at different speeds.

For example, the transmission could be configured such that geared neutral of the variator occurs at an extreme roller angle such that only positive or negative transmission ratios are obtainable. If occasional output was required in the opposite direction, a separate selectable reversing gear could be connected to the output shaft 44.

Figure 3:
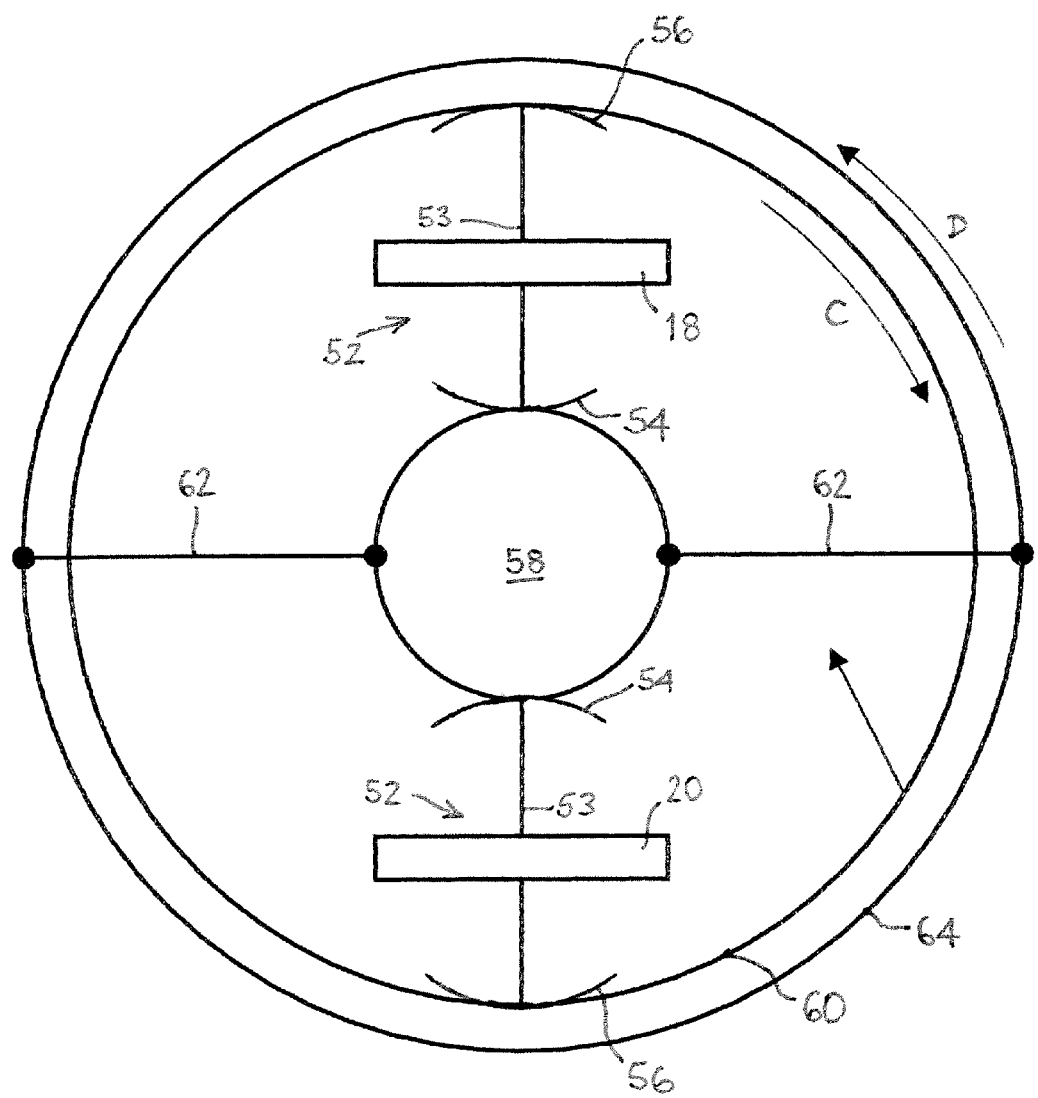
FIGS. 3 and 4 show schematic diagrams of a roller sub assembly of the first embodiment.
Figure 4:
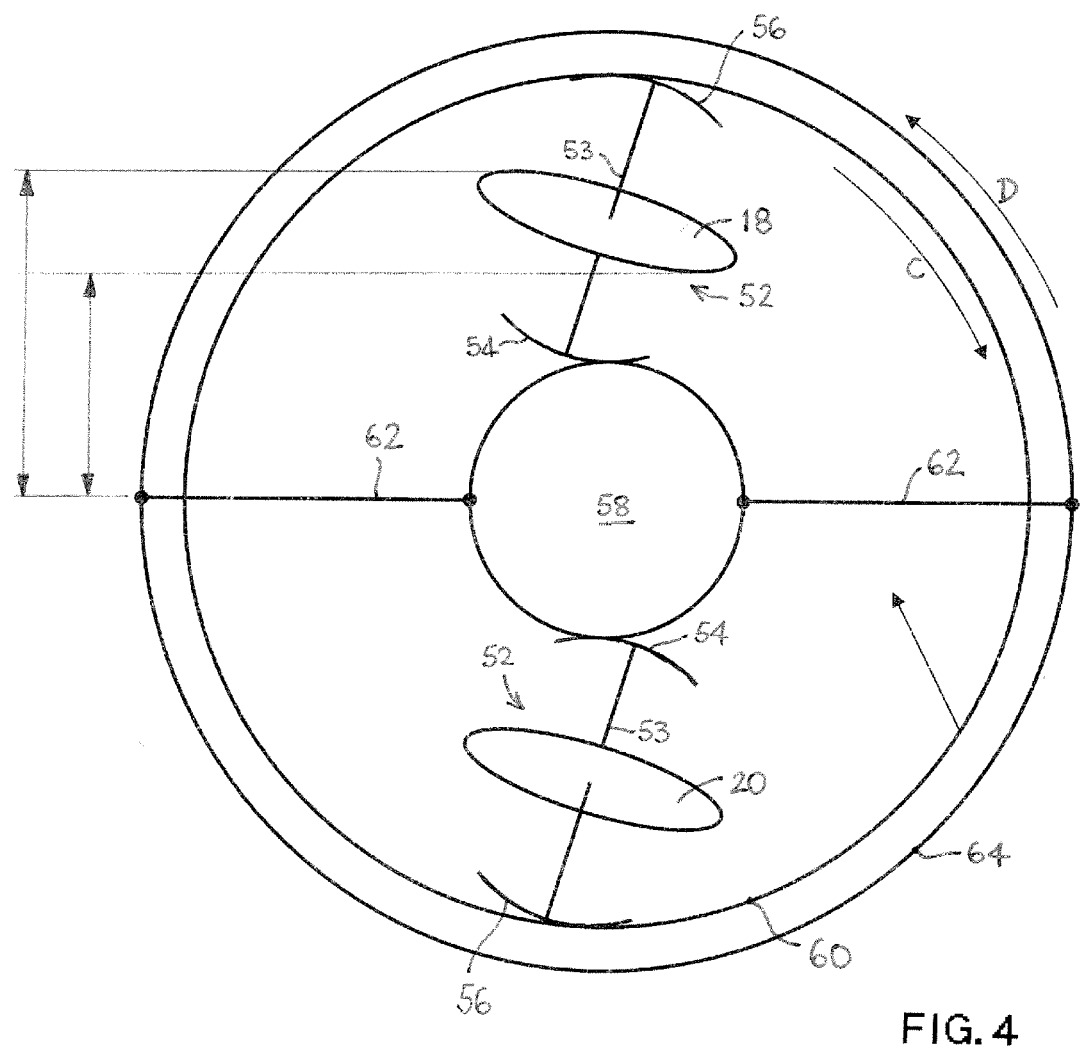

FIGS. 3 and 4 show the arrangement of FIGS. 1 and 2 in more detail. Each roller 18, 20 is mounted on a ball-pivot which enables it to rotate about a rotational axis and simultaneously allows the rotational axis to tilt, permitting the roller to precess. Only two rollers 18, 20 are shown for simplicity, although any number of rollers 18 may be used. Each pivot 40 is mounted on a truncated planet gear 52. Since the range of motion of the planet gears 52 is limited, their outer peripheries do not have to be complete and instead the planet gears comprise a diametrically-extending limb 53 extending between two arcuate toothed racks 54, 56. The innermost racks 54 engage with the teeth of a sun gear 58 and the outermost racks 56 engage with the teeth of an output annulus 60. The sun gear 58 is connected via spokes 62 to a control ring 64. The output annulus 60 and the control ring 64 are actually the same diameter but have been illustrated as being different diameters in order to show the connections of the various components.

Referring to FIG. 4, relative movement of the output annulus 60 and control ring 64 (as indicated by arrows C & D) causes the planet gears 52 to rotate, causing the rotational axes of the rollers 18, 20 to precess. As can be seen, the contact points of the two rollers 18, 20, (which inscribe loci on the drive surfaces) lie at different radii, and since the discs 12, 14 are forced to rotate at the same speed (in this embodiment), the result is that the rollers 18, 20, and the annulus 42 on which they are mounted, orbit around the rotational axis of the variator, thereby rotating the output shaft 44.

As can be seen, in order to be able to control the inclination of the rollers 18, 20 it is necessary to be able to impart a displacement to the control ring 64 relative to the output annulus 60. However, when the rollers 18, 20 are orbiting, in order to maintain a constant displacement of the control ring 64 relative to the output annulus 60, it is necessary for the output annulus 60 and the control ring 64 to rotate about the variator axis x-x at the same angular velocity as at which the rollers 18, 20 are precessing.

Figure 5A:
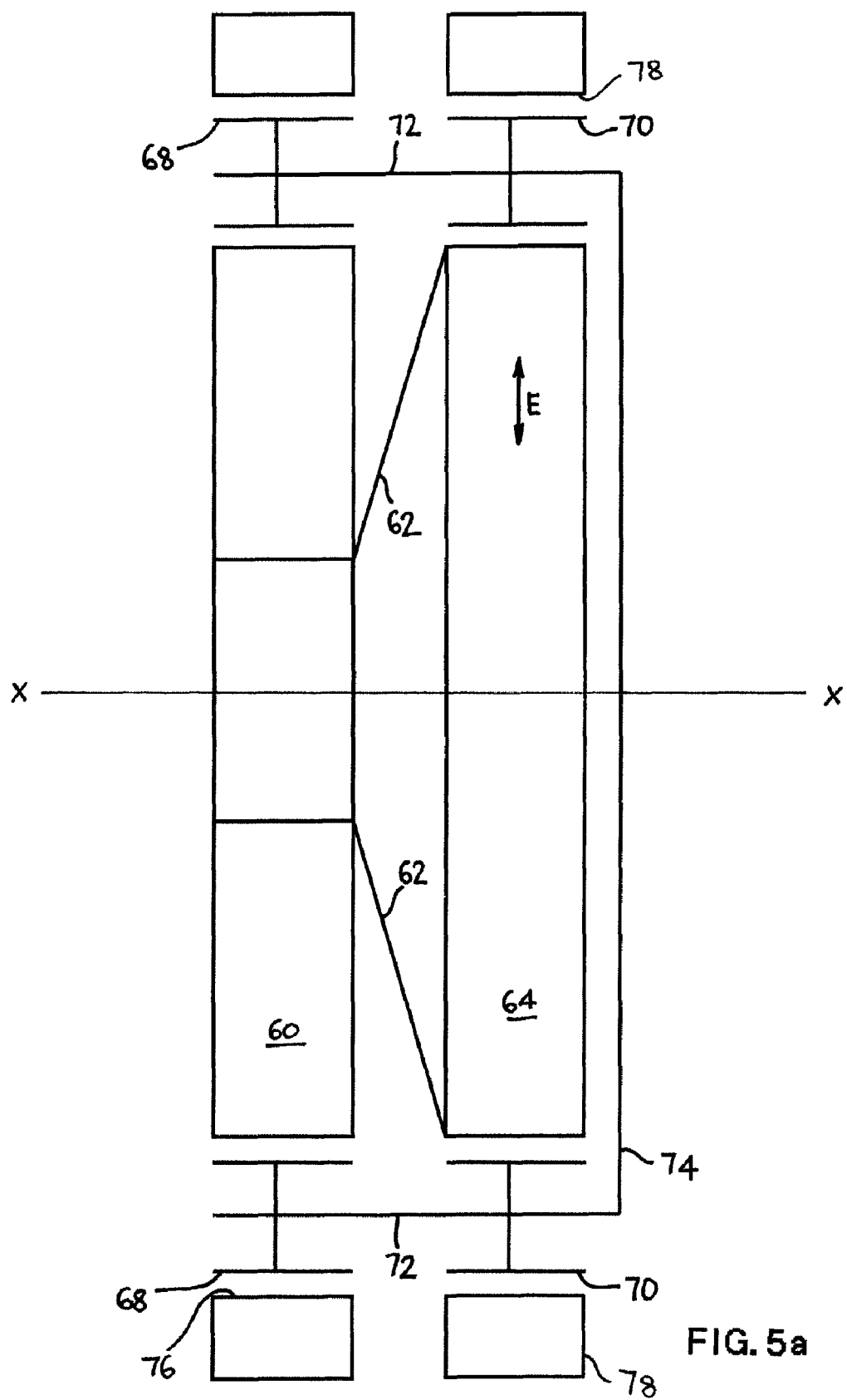
FIG. 5a shows a schematic representation of an apparatus for controlling the angle of the rollers and extracting power therefrom.
Figure 5B:
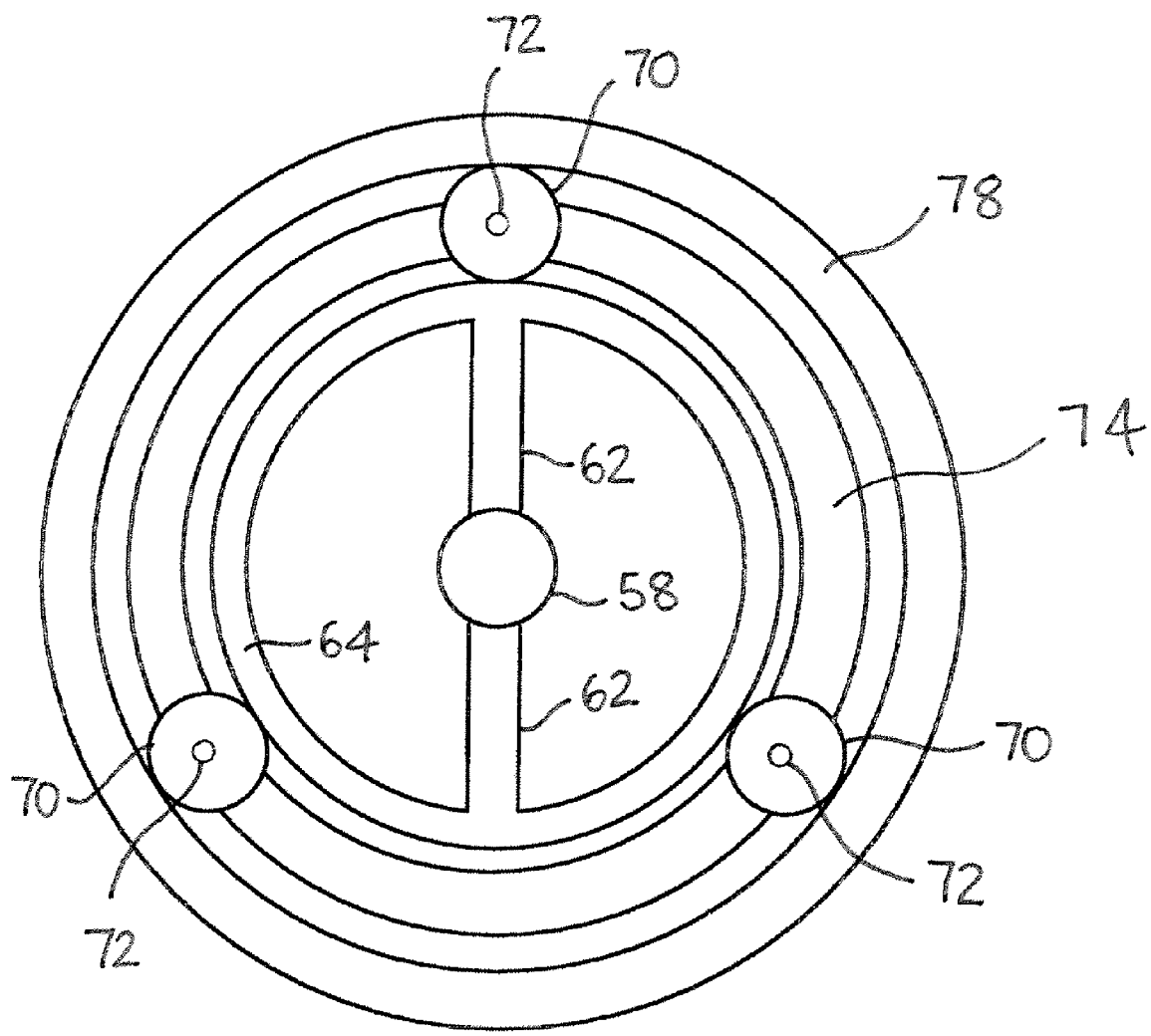
FIG. 5b shows an end-view schematic of how the planetary rollers of Figure 5a are grounded.

The roller angle control is illustrated schematically in more detail in FIGS. 5a and 5b of the drawings.

The control ring 64 is connected to the sun gear 58 by way of the spokes 62. Movement of the control ring 64 relative to the output annulus 60 can be achieved by pivoting the control ring 64 as indicated by arrow E relative to the output annulus 60. However, to maintain the control ring 64 and the output annulus 60 in a constant relative position, whilst the output annulus 60 is rotating (i.e. providing an output), both the output annulus 60 and the control ring 64 must rotate at the same angular velocity.

This is achieved by providing sets of identical rollers 68, 70 independently pivotally mounted on common axles 72 and in frictional engagement with the outer surfaces of the output annulus 42 and the control ring 64 respectively. The axles 72 are mounted on an annular plate 74 which ensures that the rollers 68, 70 are held tightly in frictional engagement with the peripheries of the output annulus 60 and the control ring 64 respectively and also ensures that axles 72 remain parallel to the rotational axis of the variator. The rollers 68 which are in contact with the output annulus 60 are also in frictional engagement with an annular surface 76 fixed with respect to the transmission housing. The rollers 70 are also in frictional contact with a further ring 78 whose rotation can be adjusted to alter the relative displacement of the control ring 64 and the output annulus 60 and thereby adjust the inclination of the rollers 18, 20. Thus, rotation of the output annulus 60 causes the axles 72 to orbit about the variator axis x-x. The orbiting of the axles 72 is transferred to the other rollers 70 and thence to control ring 64.

(The rollers 68, 70 could be replaced by gears which engage with a toothed exterior of the output annulus 60 and control ring 64 but in practice, due to the large difference in size of the output annulus 60/control ring 64 and the planetary gears, rollers are preferred instead of gears.)

In FIG. 5b it can be seen that three rollers 68, 70 are provided in each set of rollers, but any number of rollers 68, 70 may be used.

As described above with reference to FIGS. 1 to 5b, the embodiment of the invention to be described below involve variator rollers upon a respective roller carrier (corresponding to the truncated planet gears 52 of FIGS. 1 to 5b) which can be caused to tilt by virtue of a drive arrangement. The principle can be understood from FIGS. 6a and 6b, in which only one of the rollers is illustrated at 200 (and is largely contained within a shroud 202 which will be described below) and the roller carrier is at 204. Comparing FIG. 6b with FIG. 6a, the roller carrier 204 has tilted about the carrier axis 226, so that the tilt angle is non-zero. The change in the tilt angle transiently takes the roller axis away from intersection with the variator axis and the resulting steering moment has caused the roller to precess to restore intersection. The consequent inclination of the roller corresponds to an altered drive ratio, which is no longer 1:1.

The arrangement used in this and subsequent embodiments both to mount the carrier 204 such that it can tilt around the carrier axis 226 and to drive this tilting motion of the carrier comprises an inner sun gear 212 and an annular outer ring gear 214 which are both mounted concentrically with the variator axis 218 and are rotatable thereabout. The roller carrier 204 is formed as a planetary gear wheel and is arranged in the space between the sun gear 212 and ring gear 214, meshing with both. The carrier is unable to move along the variator axis because the position of the roller which it carries is dictated by the variator races. The races themselves are not shown in these drawings, but (as will be clear from subsequent drawings) lie in front of and behind the roller 200 and rotate about a common axis 218, referred to as the variator axis and lying perpendicular to the plane of the paper. The carrier is able to rotate about a carrier axis 226 which is also perpendicular to the plane of the paper. An arrangement is provided to drive the carrier to rotate about this axis and so change the carrier's "tilt angle". Let us define the tilt angle, indicated by in FIG. 6b, to be the angle between (1) line 216 radiating from the variator axis 218 (i.e. the axis of the variator races) and (2) some arbitrary line 220 along the carrier. The steering moments required to cause precession of the roller, and consequent variator ratio change, result from changes in tilt angle.

Figure 6A:
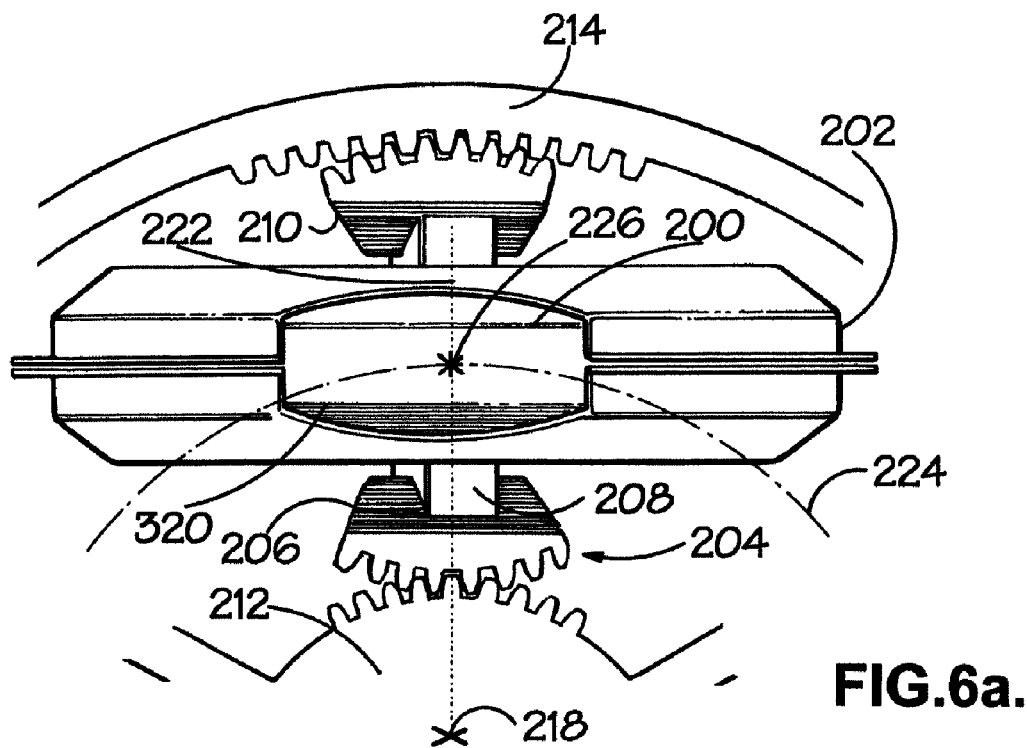
FIGS. 6a and 6b are respective perspective views of the roller and roller mounting of an embodiment of variator in accordance with the present invention.
Figure 6B:
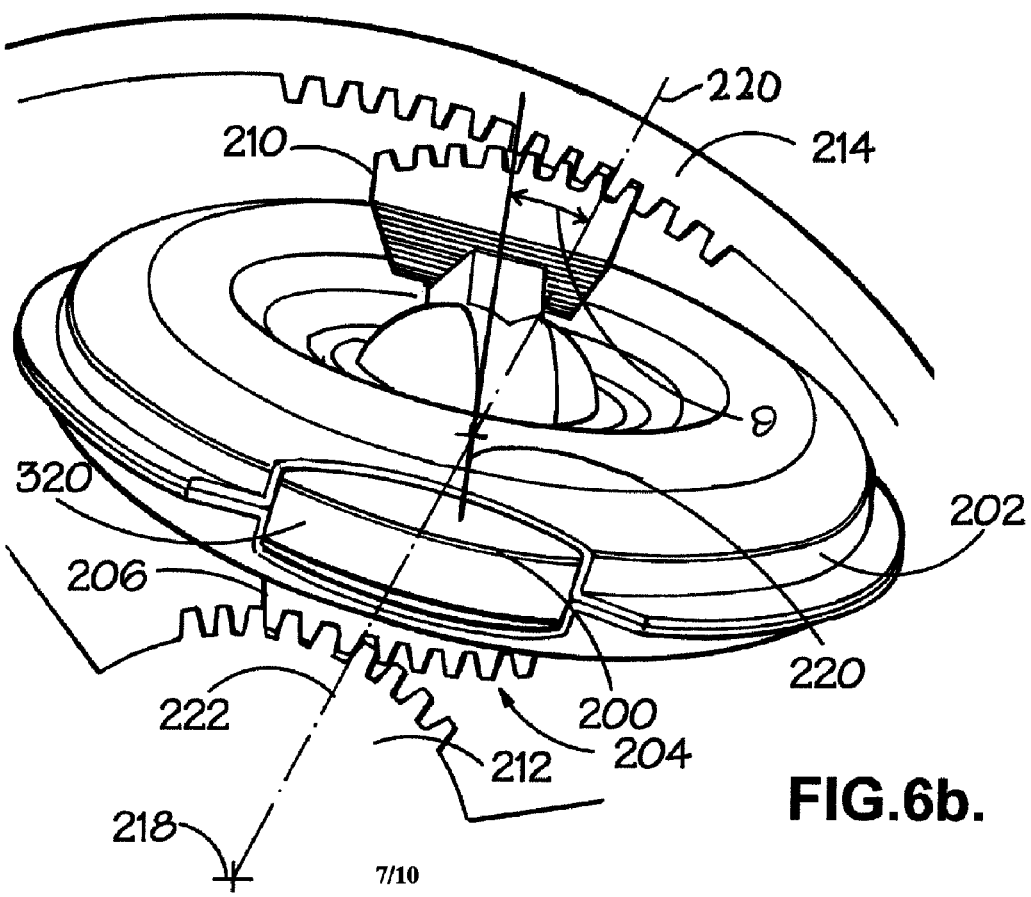

In FIG. 6a the tilt angle is zero and the variator is operating at approximately 1:1 drive ratio. The roller axis 222 is perpendicular to the variator axis 218, and intersects it, as it must do at equilibrium.

Since the carrier's range of angular motion is limited its outer periphery does not need to be formed into a complete planetary gear. Instead the carrier has a radially inner part-circular toothed portion 206 coupled through a generally radially extending limb 208 to a radially outer part-circular toothed portion 210. This formation of the carrier 204 enables it to fit into the available space without fouling other parts such as the rollers themselves.

Consider for example what would happen if the sun and ring gears 212, 214 were to be driven to rotate at the same speed, so that they—and the carrier 204—simply turned about the variator axis while maintaining fixed positions relative to each other. The tilt angle would not be changed. If the roller axis 222 were initially in intersection with the variator axis 218, as it is in FIGS. 6a and 6b, then it would remain so and no variator ratio change would result.

However, consider what happens if the sun and ring gears are displaced with respect to each other. In general this will again result in movement of the carrier and along a circular path about the variator axis. The roller centre follows a circle 224 which is the centre circle of the torus defined by the variator races. However at the same time the carrier 204 will rotate about the carrier axis 226 to change its tilt angle.

Figure 7:
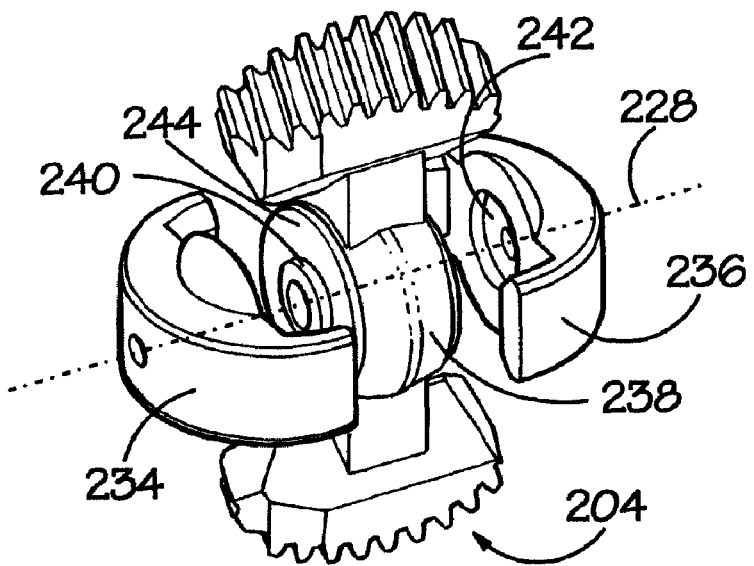
FIG. 7 is an exploded perspective view of the roller mounting of FIGS. 6a and 6b.
Figure 8:
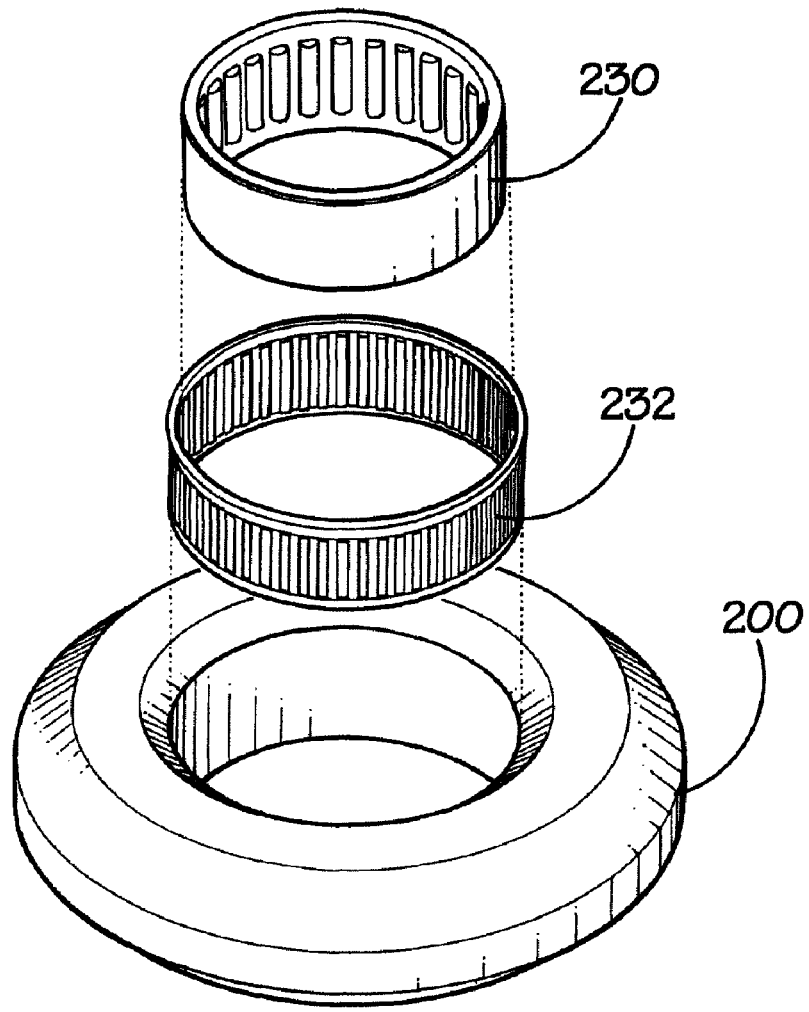
FIG. 8 is an exploded view showing the roller mounting of FIGS. 6a and 6b in more detail.
Figure 9:
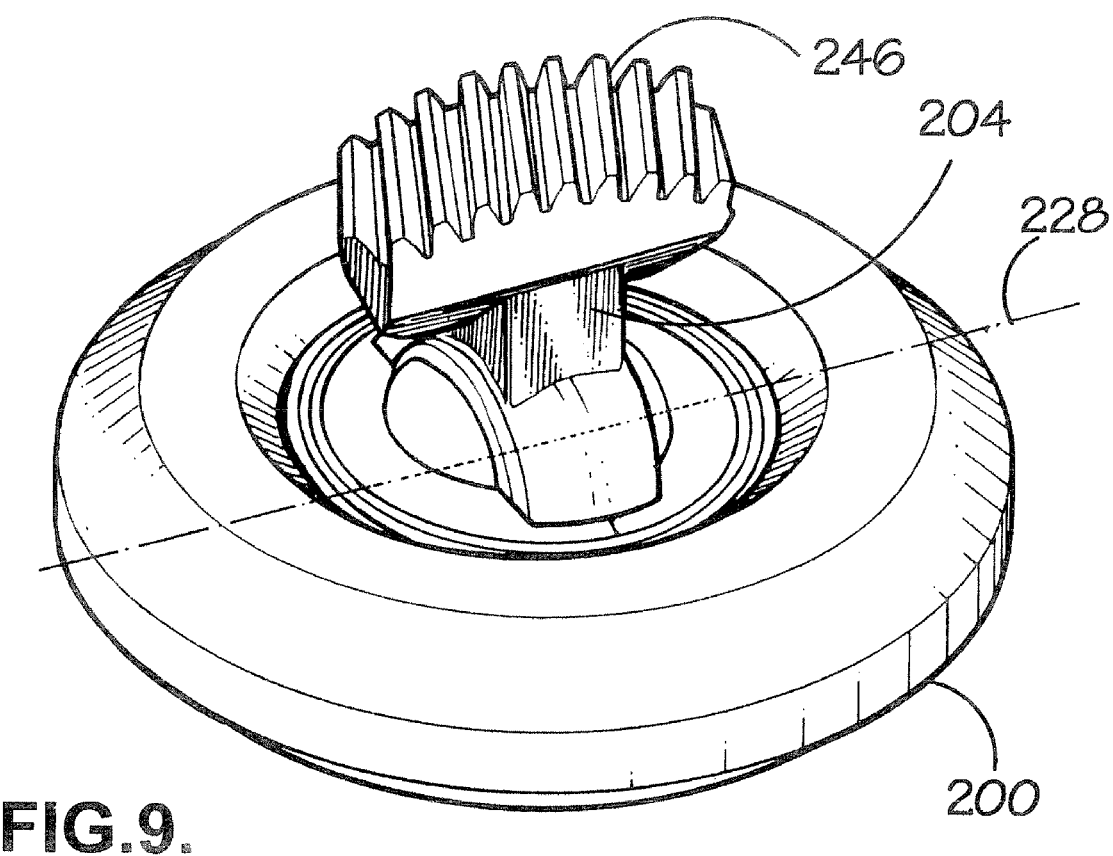
FIG. 9 is a perspective view of the roller and roller mounting of FIGS. 6a and 6b.

The roller has the freedom to precess relative to the carrier 204 by virtue of a bearing arrangement through which it is coupled to the carrier, and this aspect of the present embodiment will now be considered with reference to FIGS. 7 to 9. The bearing arrangement permits the roller 200 to (1) rotate about its own axis and (2) precess about a precession axis 228 which is defined—and fixed—relative to the carrier 204.

Rotation of the roller 200 about its own axis is provided for by means of a needle bearing 230 (FIG. 8) received in the roller's central bore. Between the roller and the bearing is provided a tolerance ring 232 (FIG. 8). By virtue of a corrugated construction, the tolerance ring provides some compliance between the roller and the bearing. In use the roller is subject by the variator races to a large compressive force along the roller's diameter. The roller is resiliently deformed somewhat as a result. The tolerance ring resiliently deforms to accommodate the roller deformation and so ensures that the compressive force is borne principally by the roller itself, rather than being passed on to the bearing 230. The inner race of the needle bearing 230 is formed in two parts 234, 236 assembled around a hub 238 of the carrier 204 (FIG. 7). The two parts 234, 236 may for example be welded together followed by machining of their outer circumference to provide the regular circular surface required of the inner bearing race. Alternatively they could be secured together by a band around their circumference (not shown) which would serve as the bearing surface. Circular spigots 240 project from either side of the hub 238 and are concentric with and aligned along the precession axis 228. The spigots are received in complementary circular recesses 242 in inner faces of the respective inner race parts 234, 236 and washers 244 separate the inner faces 241 from the adjacent faces of the hub 238. The construction permits the inner bearing race 234, 236, and hence the roller 200 carried upon it, to precess relative to the carrier 204 about precession axis 228 as mentioned above. It is important to note that the precession axis does not lie in a plane which is radial (perpendicular) to the variator axis (such as the plane of the paper in FIG. 6). Instead the precession axis 228 is inclined to such a plane to form the castor angle. The point can be best understood from FIG. 9, which shows the carrier 204 in perspective. The carrier's gear teeth are seen to be inclined to the precession axis rather than perpendicular to it. The angle of the gear teeth determines, in the present embodiment, the castor angle between the precession axis and the radial plane. One of the benefits of this arrangement is that the castor angle is not limited by the variator construction. In the prior art variators the maximum possible castor angle is limited by fouling of the actuator by the variator races. By contrast the type of construction considered here gives the designer increased freedom to choose the castor angle as necessary to meet requirements for speed of variator response and stability against oscillation.

Figure 10:
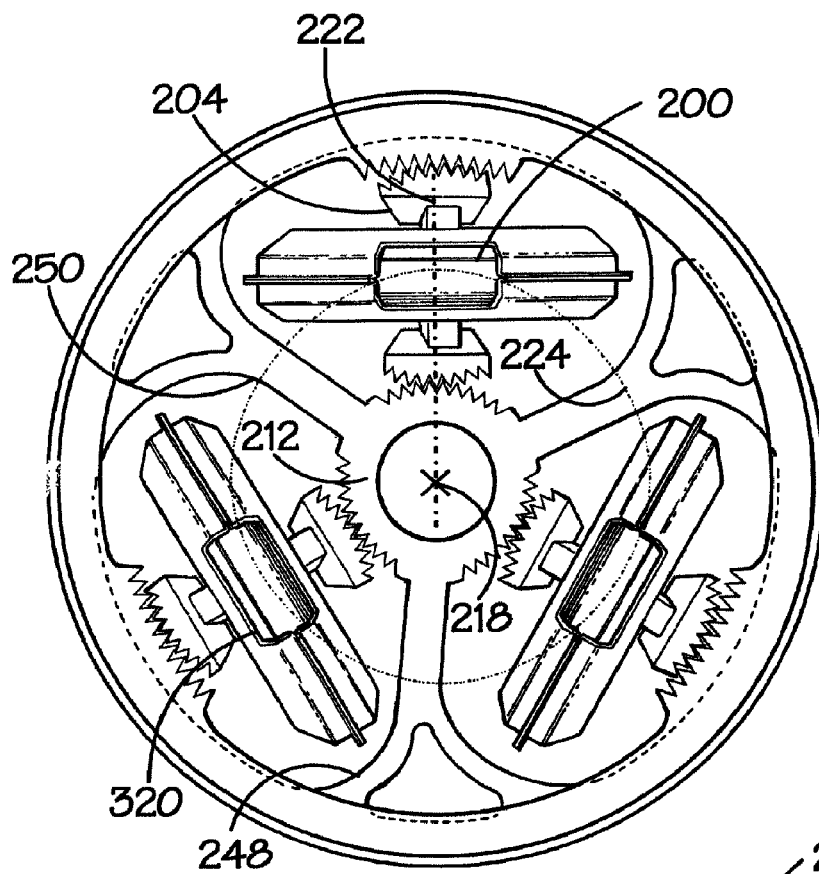
FIGS. 10 and 11 are front views of a variator fitted with the rollers and roller mountings of FIGS. 6a and 6b.
Figure 11:
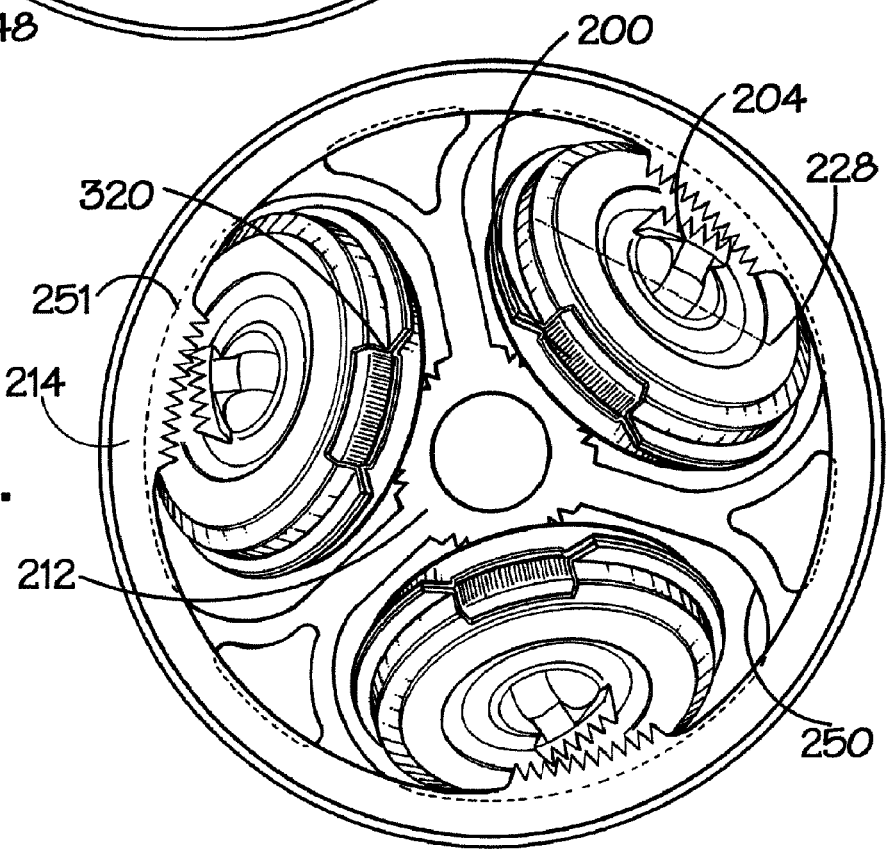

FIGS. 10 and 11 are intended to show the motion of the carriers 204 and rollers 200. These drawings show a practical arrangement with three rollers arranged at regular angular intervals within a toroidal cavity formed between a pair of toroidal variator races (omitted for purposes of clarity). The circular path which the centres of the rollers follow about the variator axis as the carriers move back and forth is once more indicated at 224 in FIG. 10. This is in fact the centre line of the toroidal cavity defined by the races. In this embodiment a spoked spider structure 248 is used to drive the sun gear 212, as will be explained below.

In FIG. 10 the variator is operating at approximately 1:1 ratio. The axes of the rollers are approximately perpendicular to the variator axis (the angle in question would be measured in a plane containing the variator axis—i.e. perpendicular to the paper—and so cannot be indicated in this view). Each roller axis 222 intersects the variator axis 218, as they must at equilibrium. The common tilt angle of each carrier 204 is defined to be zero in this condition.

Comparing FIG. 11 with FIG. 10, the sun gear 212 and the ring gear 214 have both been advanced along a clockwise direction, with the sun gear moving further than the ring gear. Several changes have consequently taken place:

i) because the sun and ring gears have both rotated in the same direction (clockwise), the carriers 204 and rollers 200 have also advanced clockwise, the centre of each roller 200 moving along the circle 224;

ii) because the sun gear 212 has rotated faster than the ring gear 214, each carrier 204 has been caused to tilt—i.e. to rotate about its carrier axis 226, changing its tilt angle;

iii) the change in carrier tilt angle has caused an angular shift of the roller axes, transiently taking them away from intersection with the variator axis. A steering effect has thus been exerted upon the rollers as previously described, causing them to precess (about precession axes 228 defined with respect to the carriers 204) to the illustrated positions, thereby restoring intersection. It will be apparent that the roller axes are no longer perpendicular to the variator axis but inclined to it. Correspondingly the variator's drive ratio has been altered and in fact the variator is shown close to one extreme of the available ratio range.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A transmission comprising a toroidal variator having first and second spaced-apart, toroidally-recessed drive surfaces defining a toroidal cavity about a rotational axis, a transmission input arranged to drive the first and second drive surfaces in opposite rotational directions, and supported on pivotal mountings between the drive surfaces, one or more rollers each arranged to contact the drive surfaces at contact points and be driven thereby about a rotational axis of the roller, wherein the contact points between each roller and the drive surfaces are movable relative to the rotational axis of the toroidal cavity whereby the roller is configured to precess in the toroidal cavity, wherein a transmission output is driven by orbiting of the pivotal mountings around the rotational axis of the toroidal cavity.

2. A transmission as claimed in claim 1, wherein a transmission ratio is variable by way of varying the relative diameters of contact loci between each roller and each of the first and second drive surfaces.

3. A transmission as claimed in claim 1, wherein a transmission ratio is variable by way of varying the angle subtended between an axis of each roller and the axis of the first or second drive surfaces.

4. A transmission as claimed in claim 1, wherein the first and second drive surfaces rotate in opposite directions but are connected to a common shaft by way of gearing.

5. A transmission as claimed in claim 1, wherein the first and second drive surfaces are arranged to rotate in opposite directions.

6. A transmission as claimed in claim 5, wherein the first and second drive surfaces rotate at equal speeds.

7. A transmission as claimed in claim 1, wherein the pivotal mountings are connected to an output annulus.

8. A transmission as claimed in claim 7, wherein the output annulus is connected to the transmission output.

9. A transmission as claimed in claim 1, having a "geared neutral" ratio whereby a finite input speed is converted into a zero output speed without disconnecting the input from the output.

10. A transmission as claimed in claim 8, wherein in geared neutral the rollers have not precessed.

11. A transmission as claimed in claim 1, wherein the pivotal mountings of the rollers are each mounted on a planet gear which engages with a sun gear and an output annulus which is connected to the transmission output.

12. A transmission as claimed in claim 11, comprising displacement means for rotating the sun gear with respect to the output annulus, whereby to adjust the inclination of the rollers.

13. A transmission as claimed in claim 12, wherein the displacement means comprises a control ring to which the sun gear is connected, means for rotating the control ring at the same speed as the output annulus and means for varying the angular displacement of the control ring with respect to the output annulus.

14. A transmission as claimed in claim 13, wherein the means for rotating the control ring at the same speed as the output annulus comprises a plurality of first rotary members in rolling contact with the output annulus and with a fixed surface radially outward of the output annulus and a plurality of second rotary members, each rotatably mounted on the same axle as a respective one of the first rotary members, in rolling contact with the control ring and with a further annular surface located radially outwardly of the control ring.

15. A transmission as claimed in claim 14, wherein the rotary members comprise rollers in frictional rolling contact.

16. A transmission as claimed in claim 14, wherein the rotary members comprise gears.

17. A transmission as claimed in claim 14, wherein the further annular surface located radially outwardly of the control ring is angularly displaceable, thereby controlling an angular position of the control ring relative to the output annulus.

18. A transmission comprising a toroidal variator having first and second spaced-apart, toroidally-recessed drive surfaces defining a toroidal cavity about a rotational axis, and supported on pivotal mountings between the drive surfaces, one or more rollers each arranged to contact the drive surfaces at contact points and to be rotatable about a rotational axis of the roller, wherein the contact points between each roller and the drive surfaces are movable relative to the rotational axis of the toroidal cavity whereby the roller is configured to precess in the toroidal cavity, wherein the transmission has an input arranged to cause the pivotal mountings to orbit around the rotational axis of the toroidal cavity such that the one or more rollers drive the spaced apart drive surfaces which are geared to rotate in opposite directions, the spaced apart drive surfaces being connected to a common transmission output.

19. A transmission comprising a toroidal variator having first and second spaced-apart, drive surfaces defining a toroidal cavity about a rotational axis, a transmission input and a drive assembly arranged to drive the drive surfaces in opposite directions, supported on pivotal mountings between the drive surfaces, one or more rollers arranged to contact the drive surfaces and be driven thereby, wherein a transmission output is driven by orbiting of the pivotal mountings around the rotational axis of the toroidal cavity;

the drive assembly including first, second, third, and fourth gears, a reversing idler gear, and first and second drive shafts;

wherein the first gear is mounted on the transmission input, the second gear is mounted on the first drive shaft, the first and second gears engage one another, the third and fourth gears engage with the reversing idler gear, the fourth gear is mounted on the second drive shaft, the first drive shaft is connected to the first drive surface, and the second drive shaft is connected to the second drive surface;

wherein rotation of the transmission input is transferred to the first drive surface via the first and second gears and the first drive shaft and is transferred to the second drive surface via the third, fourth, and reversing idler gears and the second drive shaft such that the first and second drive surfaces rotate in opposite directions.

20. A transmission as claimed in claim 19, wherein a transmission ratio is variable by way of varying the relative diameters of contact loci between each roller and each of the first and second drive surfaces.

\* \* \* \* \*